United States Patent
Shitara

(10) Patent No.: US 10,550,620 B2
(45) Date of Patent: Feb. 4, 2020

(54) PINCHING DETECTION SENSOR

(71) Applicant: KABUSHIKI KAISHA TOKAI RIKA DENKI SEISAKUSHO, Aichi (JP)

(72) Inventor: Shuji Shitara, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 45 days.

(21) Appl. No.: 15/579,971

(22) PCT Filed: Jun. 16, 2016

(86) PCT No.: PCT/JP2016/067941
§ 371 (c)(1),
(2) Date: Dec. 6, 2017

(87) PCT Pub. No.: WO2017/006737
PCT Pub. Date: Jan. 12, 2017

(65) Prior Publication Data
US 2018/0171697 A1 Jun. 21, 2018

(30) Foreign Application Priority Data
Jul. 7, 2015 (JP) .................................. 2015-136091

(51) Int. Cl.
*G01V 3/08* (2006.01)
*E05F 15/46* (2015.01)
(Continued)

(52) U.S. Cl.
CPC ................. *E05F 15/46* (2015.01); *B60J 1/00* (2013.01); *G01V 3/088* (2013.01); *E05F 15/689* (2015.01);
(Continued)

(58) Field of Classification Search
CPC .......... E05F 15/46; B60J 1/00; E05Y 2800/41
See application file for complete search history.

(56) References Cited

U.S. PATENT DOCUMENTS

| 7,400,153 B2 | 7/2008 | Shoji et al. |
| 2002/0024310 A1* | 2/2002 | Hirose .................. B60J 7/0573 318/445 |

(Continued)

FOREIGN PATENT DOCUMENTS

| JP | 2004-219311 | 8/2004 |
| JP | 2005-314949 | 11/2005 |

(Continued)

OTHER PUBLICATIONS

Official Communication issued in International Patent Application No. PCT/JP2016/067941, dated Sep. 13, 2016, along with English-language translation.

(Continued)

*Primary Examiner* — Alvaro E Fortich
(74) *Attorney, Agent, or Firm* — Greenblum & Bernstein, P.L.C.

(57) ABSTRACT

An entrapment detection sensor that detects entrapment caused by an opening/closing body includes an anode sensor electrode and a cathode sensor electrode. The anode sensor electrode is set on the opening/closing body at a location where entrapment caused by the opening/closing body occurs. The cathode sensor electrode is set on the opening/closing body at a location spaced apart by a gap from the anode sensor electrode. The entrapment detection sensor detects a charged object that approaches the anode sensor electrode as an entrapment subject and cancels detection of the charged object that approaches the cathode sensor electrode.

17 Claims, 2 Drawing Sheets

(51) Int. Cl.
  *B60J 1/00* (2006.01)
  *E05F 15/689* (2015.01)

(52) U.S. Cl.
  CPC ....... *E05Y 2400/54* (2013.01); *E05Y 2800/41* (2013.01); *E05Y 2900/55* (2013.01)

(56) References Cited

U.S. PATENT DOCUMENTS

| | | | |
|---|---|---|---|
| 2004/0112139 A1* | 6/2004 | Ogino | B60J 10/00 |
| | | | 73/756 |
| 2004/0145378 A1 | 7/2004 | Shoji et al. | |
| 2005/0179415 A1 | 8/2005 | Nakano et al. | |
| 2006/0186900 A1 | 8/2006 | Shoji et al. | |
| 2007/0113477 A1 | 5/2007 | Matsushita et al. | |
| 2007/0266635 A1* | 11/2007 | Sugiura | E05F 15/632 |
| | | | 49/27 |
| 2008/0100241 A1* | 5/2008 | Takahashi | H02H 3/006 |
| | | | 318/283 |
| 2009/0206784 A1* | 8/2009 | Inoue | H02H 7/0851 |
| | | | 318/434 |
| 2009/0314098 A1* | 12/2009 | Ogawa | H03K 17/955 |
| | | | 73/780 |
| 2011/0210755 A1* | 9/2011 | Ogawa | H03K 17/955 |
| | | | 324/686 |

FOREIGN PATENT DOCUMENTS

| | | |
|---|---|---|
| JP | 2007-137091 | 6/2007 |
| JP | 2007-169104 | 7/2007 |
| JP | 2010-236316 | 10/2010 |
| JP | 2010236316 | * 10/2010 |
| WO | 2007/147115 | 12/2007 |

OTHER PUBLICATIONS

Office Action issued in Japan Counterpart Patent Appl. No. 2015-136091, dated Oct. 30, 2018, along with an English translation thereof.

* cited by examiner

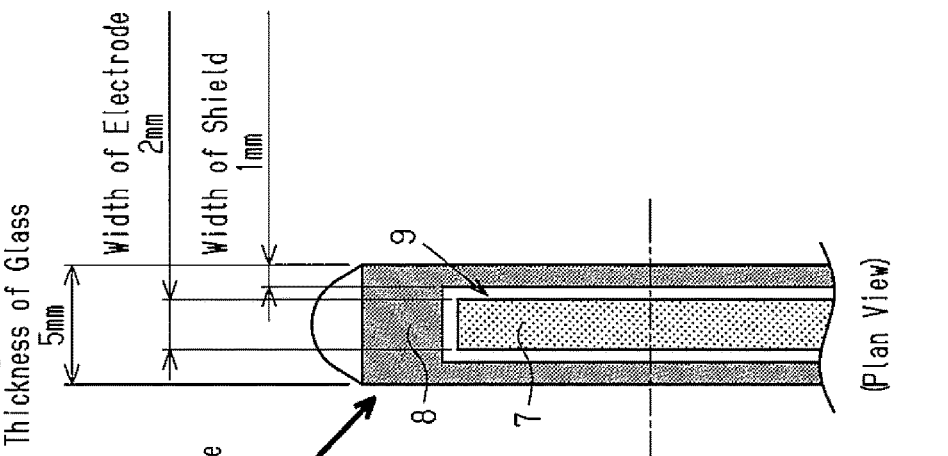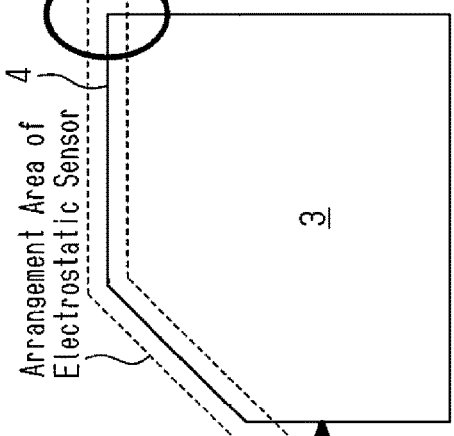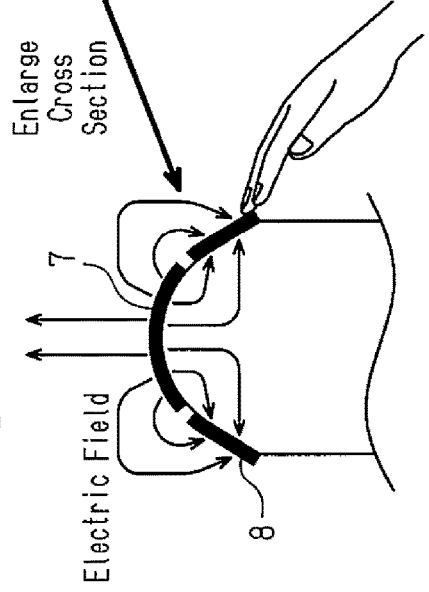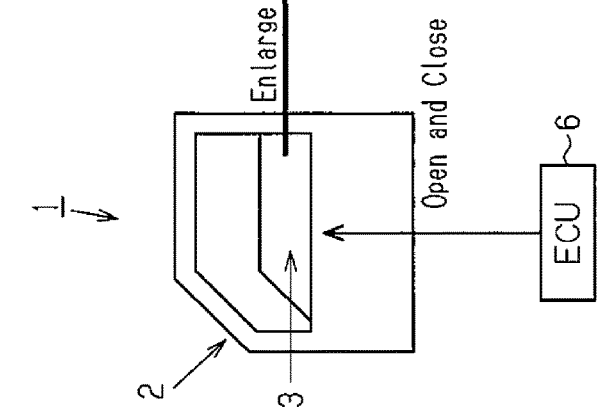

PINCHING DETECTION SENSOR

TECHNICAL FIELD

The present invention relates to an entrapment detection sensor that detects entrapment caused by an opening/closing body.

BACKGROUND ART

Patent document 1 discloses a technique that arranges an electrostatic sensor on a door window, which is one example of an opening/closing body, and detects entrapment with the electrostatic sensor. When the electrostatic sensor detects entrapment as the door window closes, the movement of the door window is reversed. This releases an entrapment subject from the door window.

Patent Document 1: Japanese Laid-Open Patent Publication No. 2005-314949

SUMMARY OF THE INVENTION

Generally, the electrostatic sensor is easily affected by a charged object that is located nearby. Thus, even if entrapment is actually not occurring, the door window may be erroneously reversed when the electrostatic sensor entrapment detects the nearby charged object during entrapment detection.

It is an object of the present invention to provide an entrapment detection sensor that is capable of properly detecting only an entrapment subject.

In one aspect, an entrapment detection sensor that detects entrapment caused by an opening/closing body includes an anode sensor electrode set on the opening/closing body at a location where entrapment caused by the opening/closing body occurs and a cathode sensor electrode set on the opening/closing body at a location spaced apart by a gap from the anode sensor electrode. The entrapment detection sensor detects a charged object that approaches the anode sensor electrode as an entrapment subject and cancels detection of the charged object that approaches the cathode sensor electrode.

In this structure, detection of a charged object that approaches the cathode sensor electrode is cancelled. Thus, only a charged object electrode is properly detected as an entrapment subject.

In the present invention, only an entrapment subject is properly detected.

BRIEF DESCRIPTION OF THE DRAWINGS

FIG. 1A is a schematic view illustrating the structure of a power window device.

FIG. 1B is an enlarged view illustrating a window glass.

FIG. 1C is an enlarged plan view of the window glass.

FIG. 1D is a diagram illustrating a state in which a charged object that has approached the window glass from beside is in contact with a shield.

DESCRIPTION OF THE EMBODIMENTS

Figure 2A:
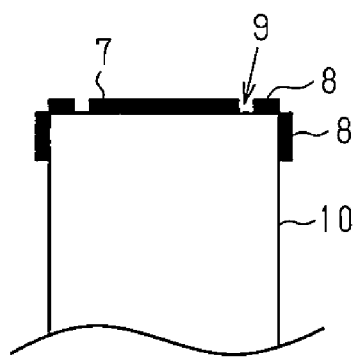
FIG. 2A is a diagram illustrating a modified example of the shape of an upper end surface of the window glass.

One embodiment of an entrapment detection sensor will now be described. The entrapment detection sensor of the present example is applied to a vehicle power window device, which is one example of an opening/closing controller. In the power window device, the entrapment detection sensor is used to detect entrapment caused by an opening/closing body.

As illustrated in FIG. 1A, a power window device 1 includes a door 2. The door 2 of a door includes a window glass 3 that is subject to the control of the power window device 1. The power window device 1 controls opening and closing movements of the window glass 3. The opening movement of the window glass 3 is defined by a lowering movement of the window glass 3, and the closing movement of the window glass 3 is defined by a lifting movement of the window glass 3. The window glass 3 slides in a window frame and corresponds to an opening/closing body.

As illustrated in FIG. 1B, an electrostatic sensor 5, which is one example of an entrapment detection sensor, is arranged on an upper end surface 4 of the window glass 3. The upper end surface 4 of the window glass 3 corresponds to a distal end surface of the window glass 3 with respect to a movement direction of the window glass 3 when lifted. The electrostatic sensor 5 detects entrapment when the capacitance resulting from the accumulated electric charge becomes greater than or equal to a threshold value. In such a case, the electrostatic sensor 5 can detect the approach of a charged object, in addition to contact of a charged object, depending on the setting of the threshold value.

The power window device 1 includes an electronic control unit (ECU) 6 (refer to FIG. 1A) that centrally controls the opening and closing movements of the window glass 3 and an operation switch (not illustrated) used for an operation input that starts the opening or closing movement of the window glass 3. The operation switch is arranged near a seat. When an operation input is performed on the operation switch, the operation input is recognized by the ECU 6. As a result, when a user performs an opening operation on the operation switch, an opening movement lowers the window glass 3 under the control of the ECU 6. When the user performs a closing operation on the operation switch, a closing movement lifts the window glass 3 under the control of the ECU 6.

The opening operation and the closing operation can both be performed as either one of a manual operation that stops movement of the window glass 3 when the manual operation is cancelled and an automatic operation that continues movement of the window glass 3 until the window glass 3 reaches a fully-open position or a fully-closed position. In the automatic operation, an operation for continuing a lowering movement of the window glass 3 until the window glass 3 reaches the fully-open position is referred to as the "automatic down operation," and an operation for continuing a lifting movement of the window glass 3 until the window glass 3 reaches the fully-closed position is referred to as the "automatic up operation."

When the electrostatic sensor 5 detects entrapment during a lifting movement of the window glass 3 started as an automatic up operation, the ECU 6 reverses movement of the window glass 3. This releases an entrapment subject from the window glass 3.

The upper end surface 4 of the window glass 3 has an outwardly curved shape (refer to FIG. 1D). The upper end surface 4 will hereinafter also be referred to as the outwardly curved surface 4. An electrode 7 corresponding to an anode sensor electrode of the electrostatic sensor 5 is set on a peak of the outwardly curved surface 4, and a shield 8 corresponding to a cathode sensor electrode is set on basal portions of the outwardly curved surface 4. The peak of the outwardly curved surface 4 at which the electrode 7 is set is where entrapment caused by the window glass 3 occurs. Each basal portion of the outwardly curved surface 4 at which the shield 8 is set is where entrapment caused by the window glass 3 does not occur. A charged object also approaches and contacts the basal portions of the outwardly curved surface 4 from beside. In other words, the peak of the outwardly curved surface 4 is the central portion of the upper end surface of the window glass 3 and extends in a direction that is substantially orthogonal to an opening/closing direction of the window glass 3. The basal portions of the outwardly curved surface 4 are the side surfaces at the end of the window glass 3 that are adjacent to the central portion of the upper end surface of the window glass 3 (or in proximity of central portion of upper end surface).

The potential at the shield 8 is the same as the potential at a GND level of an electric circuit including the electrostatic sensor 5 and the same as the potential at a body of the vehicle that is connected to ground. In the present example, the electrode 7 and the shield 8 are both arranged at the edge (upper end surface 4 having outwardly curved shape) of the window glass 3. The upper end surface 4 of the window glass 3 usually undergoes edge processing (end surface treatment) and is thus not transparent. Thus, when the sensor electrode is set on the upper end surface 4, the outer appearance of the window glass 3 is not adversely affected. When a transparent electrode or the like that is light-transmissive is used as the sensor electrode, the sensor electrode can be further unnoticeable.

As illustrated in FIG. 1C, for example, when the window glass 3 has a thickness of 5 mm, the electrode 7 having a width of 2 mm in a plan view is set on the peak of the upper end surface 4. The shield 8 having a width of 1 mm in a plan view is set on the basal portions of the upper end surface 4 surrounding the electrode 7 and spaced apart from the electrode 7 by a gap 9 of 0.5 mm.

The operation of the electrostatic sensor 5 will now be described.

As illustrated in FIG. 1D, the electrostatic sensor 5 detects changes in an electric field that is directed from the electrode 7 toward the shield 8. When a hand or a finger, which is a charged object, exists between the upper end surface 4 of the window glass 3 and the window frame, the capacitance increases as the electrode 7 that is set on the peak of the upper end surface 4 receives an electric charge from the charged object. When the capacitance reaches a threshold value, the electrostatic sensor 5 detects entrapment. That is, the electrostatic sensor 5 detects a charged object that approaches the electrode 7 as an entrapment subject.

When a hand or a finger, which is a charged object, approaches the window glass 3 from beside, even if the charged object contacts the shield 8, its shielding effect does not produce changes in the electric field. Thus, the capacitance does not increase. Accordingly, the electrostatic sensor 5 does not detect entrapment. In this case, the electrostatic sensor 5 does not detect the charged object that approaches the shield 8 as an entrapment subject. That is, detection of the charged object that approaches the shield 8 is cancelled.

As described above, the present embodiment has the following advantages.

(1) The electrostatic sensor 5 detects a charged object that approaches the electrode 7 as an entrapment subject and cancels detection of a charged object that approaches the shield 8. Thus, only an entrapment subject is detected.

(2) The electrode 7 and the shield 8 are both set on the distal end surface (in the present example, upper end surface 4) of the window glass 3 with respect to the movement direction of the window glass 3 when closing. This structure allows the sensor electrode to be set without adversely affecting the outer appearance of the window glass 3.

(3) The electrostatic sensor 5 detects a charged object that approaches the peak of the upper end surface 4, which has an upwardly curved shape, as an entrapment subject and cancels detection of the charged object that approaches the basal portions of the outwardly curved upper end surface 4. Thus, detection of an entrapment subject is limited to only the peak, which is where entrapment occurs.

(4) The shield 8 is set on the upper end surface 4 of the window glass 3 surrounding the electrode 7. In this structure, the electrostatic sensor 5 detects a charged object between the window frame and the window glass 3 as an entrapment subject and cancels detection of a charged object that approaches the window glass 3 from beside. Thus, only an entrapment subject is detected.

(5) The electrostatic sensor 5 detects entrapment when the capacitance resulting from the electric charge accumulated between the electrode 7 and the shield 8 becomes greater than or equal to the threshold value. In this structure, the distance between the electrode 7 and the shield 8 is defined by the gap 9. Entrapment is detected when the capacitance that is inversely proportional to the distance becomes greater than or equal to the threshold value. The use of the electrostatic sensor 5 in such a manner ensures that only an entrapment subject is detected.

(6) When the gap 9 between the electrode 7 and the shield 8 is narrowed like in the electrostatic sensor 5 of the present example, the capacitance increases. The increased capacitance improves the accuracy of detection.

(7) Noise emitted from the electrode 7 is attracted toward the nearby shield 8. This reduces the emitted noise.

(8) A charged object can be detected in the entrapment direction (in the present example, upper direction). Further, detection of the charged object can be cancelled in a horizontal direction and a downward direction that differ from the entrapment direction.

(9) Entrapment is detected by the electrostatic sensor 5. Thus, the approach or contact of a charged object reverses movement of the window glass 3. As a result, pressure is not applied to an entrapment subject.

The above embodiment may be modified as described below.

Instead of the structure in which the upper end surface 4 of the window glass 3 has the outwardly curved shape as illustrated in FIG. 1D, a structure in which the upper end surface 4 of the window glass 3 is flat as illustrated in FIG. 2A may be employed. In this case, the electrode 7 is set on the upper end surface 4 around the central portion in a thickness-wise direction of the window glass 3, and the shield 8 is spaced apart by the gap 9 from the electrode 7 surrounding the electrode 7. Instead of or in addition to the structure in which the shield 8 is set on the upper end surface 4, a structure in which the shield 8 is set on a side surface 10 of the window glass 3 may be used. The structure in which the shield 8 is set on the side surface 10 of the window glass 3 may be applied to the above embodiment.

Figure 2B:
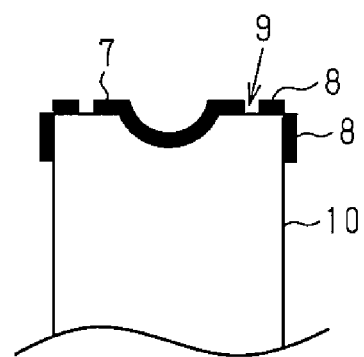
FIG. 2B is a diagram illustrating another modified example of the shape of the upper end surface of the window glass.

As illustrated in FIG. 2B, a structure in which the upper end surface 4 of the window glass 3 around the central portion in the thickness-wise direction of the window glass 3 is recessed may be employed. In this structure, the electrode 7 is set on the upper end surface 4 around the central portion in the thickness-wise direction of the window glass 3 in and near the entire recess. Instead of or in addition to the structure in which the shield 8 is set on the upper end surface 4, a structure in which the shield 8 is set on the side surface 10 of the window glass 3 may be employed.

The thickness of the window glass 3, the width of the electrode 7, the width of the shield 8, and the dimensions of the gap 9 illustrated in FIG. 10 may be changed in accordance with a targeted capacitance or the like.

The entrapment detection sensor according to the present invention may be applied to an opening/closing controller that controls an opening/closing body such as a shutter of a building in which an opening movement is defined by a lifting movement and a closing movement is defined by a lowering movement. In this case, the sensor electrode is set on a shutter or the like, which is an opening/closing body.

The entrapment detection sensor according to the present invention may be applied to an opening/closing controller that controls an opening/closing body that moves in the horizontal direction, for example, a sliding door of a vehicle or an automatic door of a building. In this case, the sensor electrode is set on a door or the like, which is an opening/closing body.

The entrapment detection sensor according to the present invention may be applied to an opening/closing controller that controls a sunroof or the like of a vehicle.

The invention claimed is:

1. An entrapment detection sensor that detects entrapment caused by an opening/closing body including a distal end surface defined by an outwardly-curved surface that has a peak and a basal portion surrounding the peak, the entrapment detection sensor comprising:
   an anode sensor electrode set on the opening/closing body at a location where entrapment caused by the opening/closing body occurs, wherein the anode sensor electrode is arranged at the peak of the outwardly curved-surface; and
   a cathode sensor electrode set on the opening/closing body at a location, spaced by a gap, from the anode sensor electrode, wherein the cathode sensor electrode is arranged at the basal portion surrounding the peak of the outwardly curved surface,
   wherein the entrapment detection sensor detects a charged object that approaches the anode sensor electrode in an entrapment direction, as an entrapment subject and cancels detection of the charged object, by not producing a predetermined change in electric field, when the charged object approaches the cathode sensor electrode in a direction different than the entrapment direction.

2. The entrapment detection sensor according to claim 1, wherein
   the opening/closing body is a window glass that includes the distal end surface and that slides in a window frame, and
   the anode sensor electrode and the cathode sensor electrode surrounding the anode sensor electrode are set on the distal end surface of the window glass.

3. The entrapment detection sensor according to claim 1, wherein the entrapment detection sensor detects the charged object as the entrapment subject when capacitance resulting from an electric charge accumulated between the anode sensor electrode and the cathode sensor electrode becomes greater than or equal to a threshold value.

4. The entrapment detection sensor according to claim 1, wherein the cathode sensor electrode is provided at each side of the anode sensor electrode, in a thickness direction of opening/closing body.

5. The entrapment detection sensor according to claim 1, wherein the gap extends in a direction of a thickness of the opening/closing body.

6. The entrapment detection sensor according to claim 1, wherein a direction of movement of the opening/closing body is in a horizontal direction.

7. The entrapment detection sensor according to claim 1, wherein a direction of movement of the opening/closing body is in a vertical direction.

8. The entrapment detection sensor according to claim 1, wherein a direction of movement of the opening/closing body is within a horizontal orientation.

9. An entrapment detection sensor that detects entrapment caused by an opening/closing body including a distal end surface and a side surface continuous with the distal end surface, the entrapment detection sensor comprising:
   an anode sensor electrode set on the opening/closing body at a location where entrapment caused by the opening/closing body occurs, wherein the anode sensor electrode is arranged at a central portion of the distal end surface in a thickness direction of the opening/closing body; and
   a cathode sensor electrode set on the opening/closing body at a location, spaced by a gap, from the anode sensor electrode, wherein the cathode sensor electrode is arranged surrounding the anode sensor electrode at a peripheral portion of the distal end surface and at the side surface,
   wherein the entrapment detection sensor detects a charged object that approaches the anode sensor electrode in an entrapment direction, as an entrapment subject and cancels detection of the charged object, by not producing a predetermined change in electric field, when the charged object approaches the cathode sensor electrode in a direction different than the entrapment direction.

10. The entrapment detection sensor according to claim 9, wherein the side surface is transverse to the distal end surface and extends in a plane of movement of the opening/closing body.

11. The entrapment detection sensor according to claim 9, wherein the entrapment detection sensor detects the charged object as the entrapment subject when capacitance resulting from an electric charge accumulated between the anode sensor electrode and the cathode sensor electrode becomes greater than or equal to a threshold value.

12. The entrapment detection sensor according to claim 9, wherein the opening/closing body is a window that includes the distal end surface and that slides in a window frame.

13. The entrapment detection sensor according to claim 9, wherein the distal end surface of the opening/closing body has an outwardly curved shape in a direction of the thickness of the opening/closing body.

14. The entrapment detection sensor according to claim 9, wherein the distal end surface of the opening/closing body includes an inwardly curved shape recess in a direction of the thickness of the opening/closing body.

15. The entrapment detection sensor according to claim 9, wherein a direction of movement of the opening/closing body is in a horizontal direction.

16. The entrapment detection sensor according to claim 9, wherein a direction of movement of the opening/closing body is in a vertical direction.

17. The entrapment detection sensor according to claim 9, wherein a direction of movement of the opening/closing body is within a horizontal orientation.

* * * * *